April 29, 1958  D. J. SCHLANGER  2,832,522
CONTAINER COVER AND METHOD OF MAKING
Filed Nov. 20, 1953  9 Sheets-Sheet 1

INVENTOR.
DANIEL J. SCHLANGER
BY
HIS ATTORNEYS

April 29, 1958  D. J. SCHLANGER  2,832,522
CONTAINER COVER AND METHOD OF MAKING
Filed Nov. 20, 1953  9 Sheets-Sheet 2

INVENTOR.
DANIEL J. SCHLANGER
BY
HIS ATTORNEYS

April 29, 1958   D. J. SCHLANGER   2,832,522
CONTAINER COVER AND METHOD OF MAKING
Filed Nov. 20, 1953   9 Sheets-Sheet 5

INVENTOR.
DANIEL J. SCHLANGER
BY
Connolly and Hutz
HIS ATTORNEYS

April 29, 1958 D. J. SCHLANGER 2,832,522
CONTAINER COVER AND METHOD OF MAKING
Filed Nov. 20, 1953 9 Sheets-Sheet 6

INVENTOR.
DANIEL J. SCHLANGER
BY
HIS ATTORNEYS

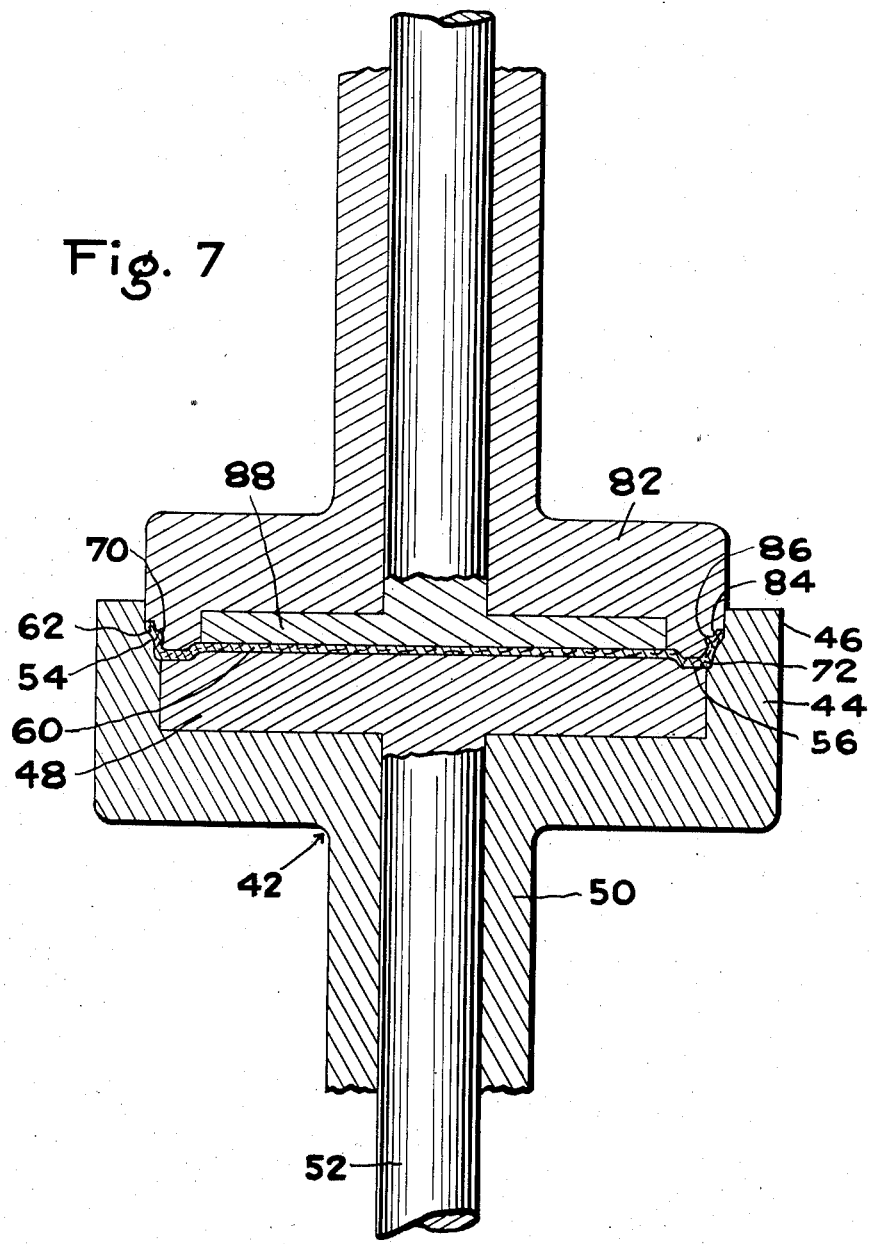

April 29, 1958     D. J. SCHLANGER     2,832,522
CONTAINER COVER AND METHOD OF MAKING
Filed Nov. 20, 1953     9 Sheets-Sheet 8

INVENTOR
DANIEL J. SCHLANGER
HIS ATTORNEYS

April 29, 1958  D. J. SCHLANGER  2,832,522
CONTAINER COVER AND METHOD OF MAKING
Filed Nov. 20, 1953  9 Sheets-Sheet 9

INVENTOR.
DANIEL J. SCHLANGER
BY
HIS ATTORNEYS

United States Patent Office 2,832,522
Patented Apr. 29, 1958

2,832,522

CONTAINER COVER AND METHOD OF MAKING

Daniel J. Schlanger, Great Neck, N. Y., assignor to Keyes Fibre Company, Portland, Maine, a corporation of Maine Application November 20, 1953, Serial No. 393,357

3 Claims. (Cl. 229—2.5)

This invention relates to closure members or covers for use on containers and the like, and more particularly to covers for containers which are to receive goods that are to keep from spilling out, such as liquids, or liquefiable or pourable solids such as for example, drinks, ice cream, frozen foods and finely divided particles.

Among the objects of the present invention is the provision of a simplified cover or lid construction which may be produced very inexpensively and which has very good sealing and holding characteristics. Another object of the invention is the provision of improved methods for making a cover. The above as well as additional objects will be more clearly understood from the following description considered together with the accompanying drawings wherein.

Figure 4:
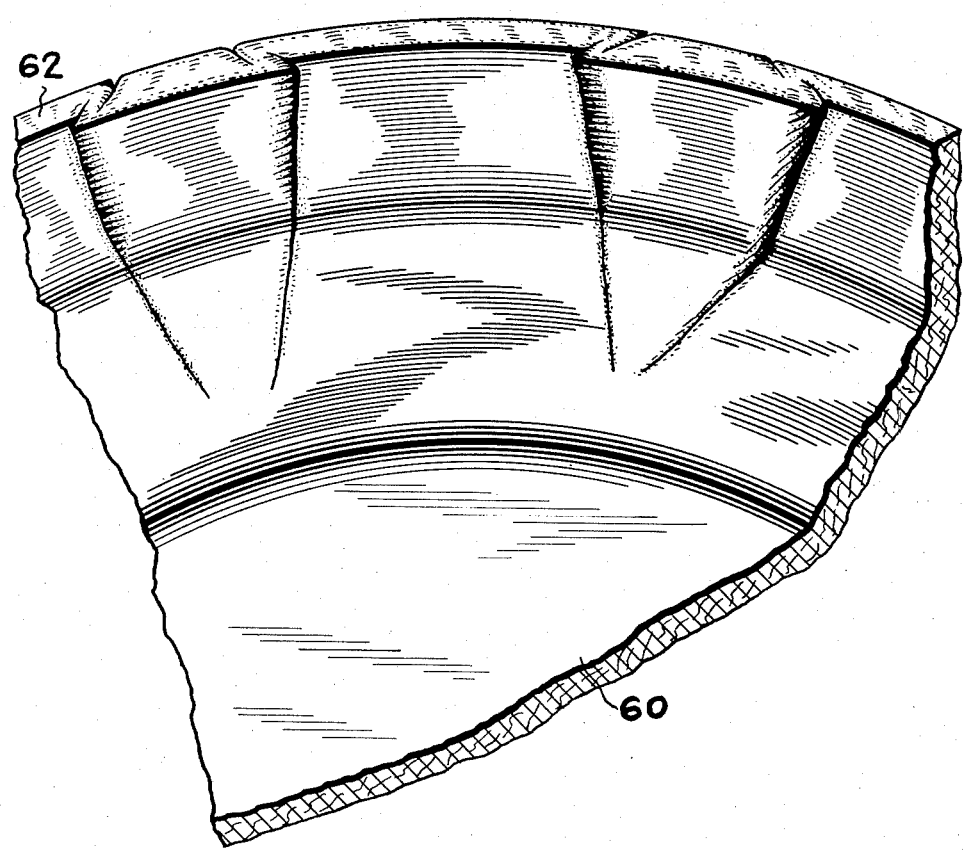
Fig. 4 is an enlarged detail view of the partly made cover after completion of the step shown in Fig. 3.
Figure 5:
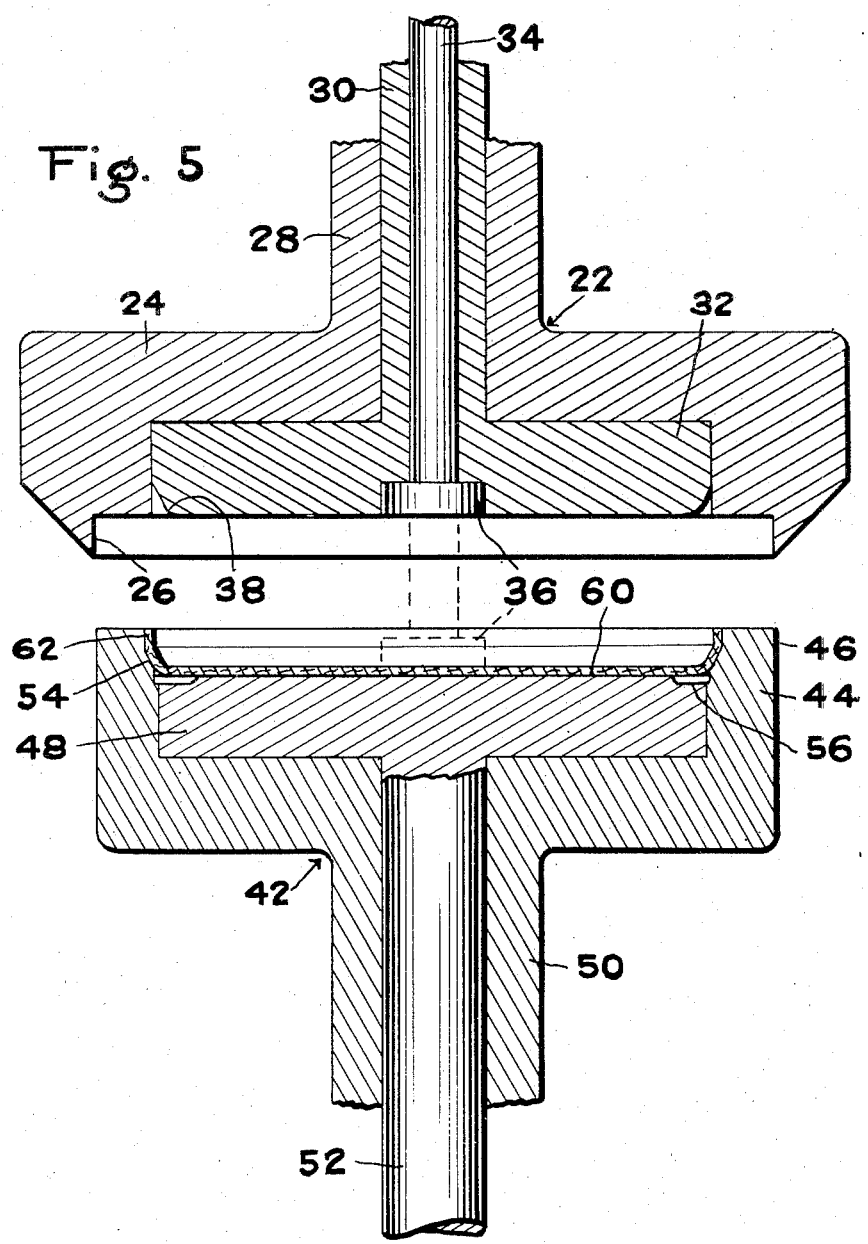
Figure 6:
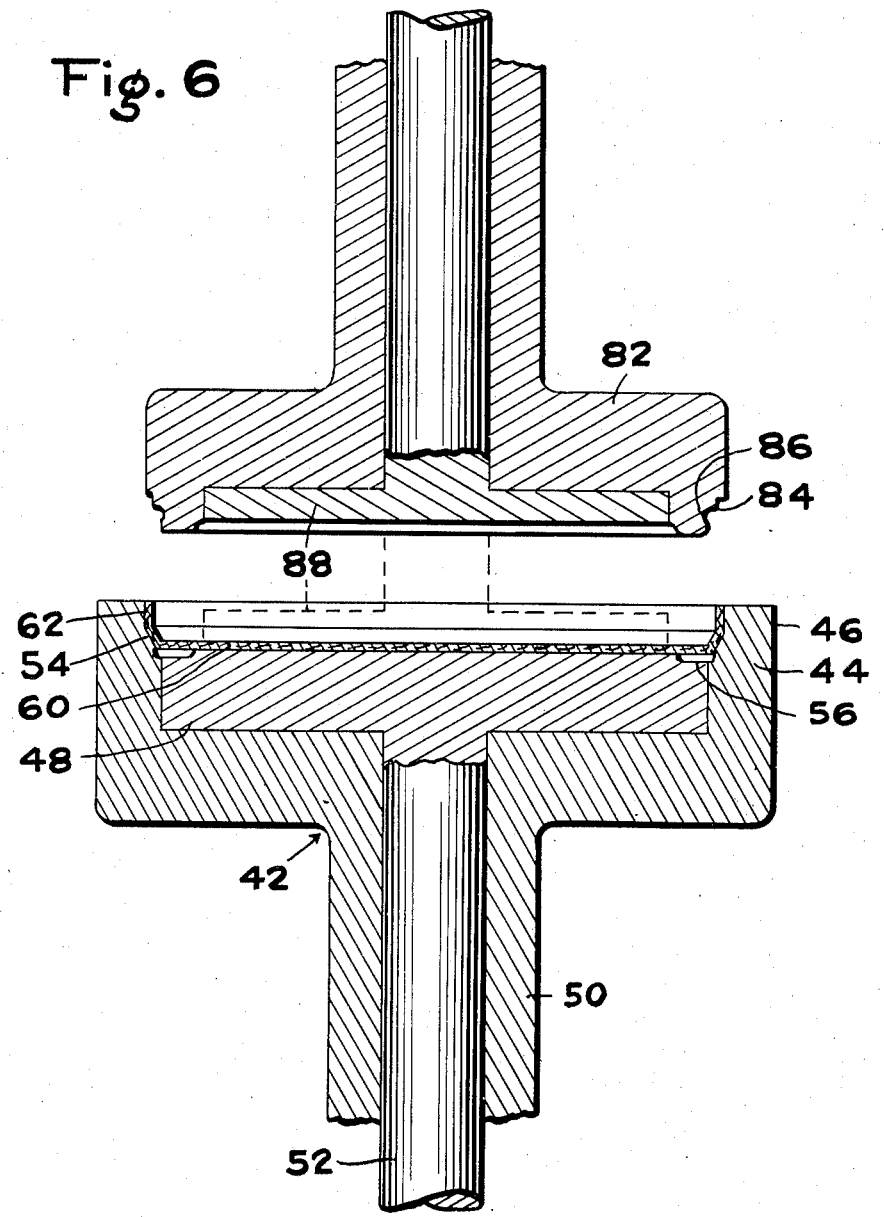
Figure 7A:
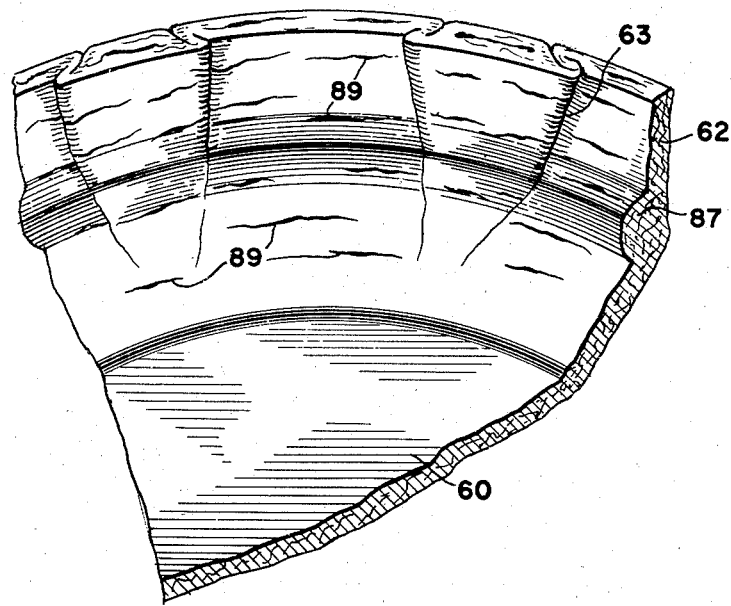
Figure 8:
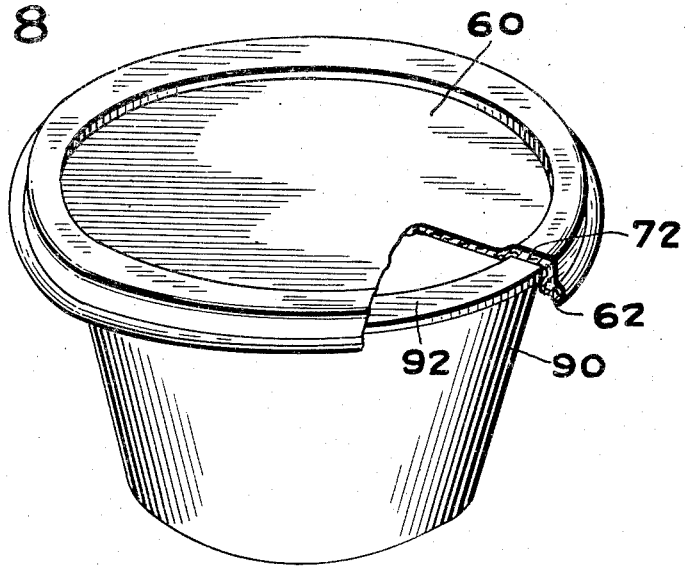
Figure 9:
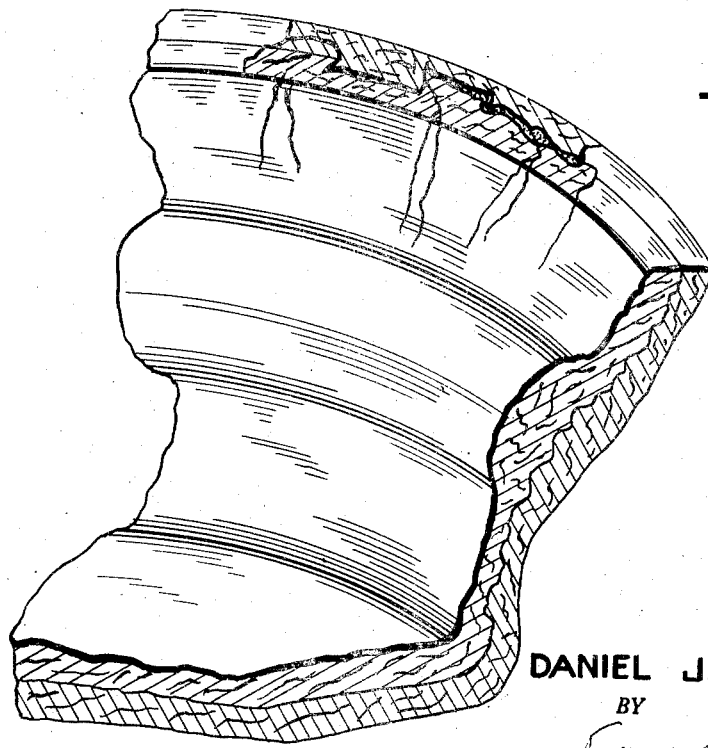

Figs. 5, 6, and 7 show further steps in the method of the present invention;

Fig. 7A is a view similar to Fig. 4 but showing the cover after completion of the step shown in Fig. 7;

Fig. 8 is a perspective view partly broken away of a cover made according to the present invention and held in place on a container; and Fig. 9 is an enlarged detail view showing a modified form of cover made according to the present invention.

It has been discovered that a very effective cover can be made by forming a paper blank with an encircling upstanding wall to provide a generally cup-like configuration and then ironing the wall to compact it and to also provide it with an internally directed bead or bulge for holding the ironed product on a container. The resulting cover can be snapped over the mouth of an open-topped container, such as one having a marginal flange, and holds itself in place very securely. At the same time, the cover can be readily removed and replaced any number of times.

Figure 1:
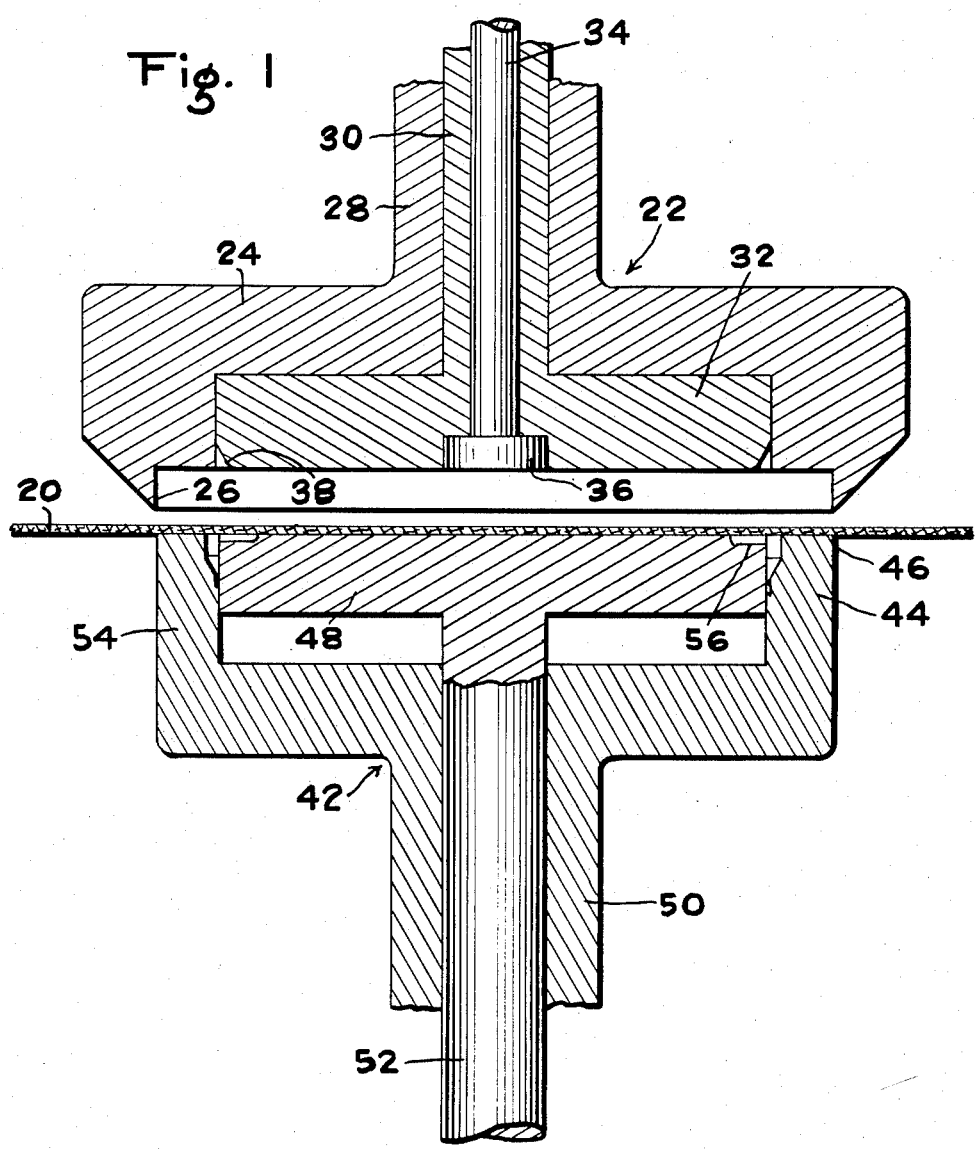
Fig. 1 is a more or less diagrammatic view of a step in the making of a container cover in accordance with the present invention.

Referring to the figures, there is shown in Fig. 1 a sheet of cover-forming material 20 which can be a paper board about 1/16 inch thick. The sheet is placed between a set of dies having an upper die assembly 22 and a lower die assembly 42.

The upper die assembly includes an external blanking or cutting die 24 with a depending marginal cutting edge 26, held on an operating arm 28. The arm is shown as a hollow tube through which passes a second operating arm 30 carrying a shaping die 32. This shaping die can be recessed within the internal blanking die 24 so that it does not interfere with the blanking operation. A third operating arm 34 can be positioned within arm 30 to carry a depending holding foot 36 which can also be recessed as shown.

The lower die assembly 42 is similarly constructed to have an outer blanking-shaping die 44 with a cutting edge 46 that cooperates with edge 26 of upper blanking die 24. Recessed within the lower blanking-shaping die 44 is a lower auxiliary shaping die 48. Lower dies 44 and 48 can be manipulated as by operating arms 50, 52 connected in a manner similar to that shown for the upper die assembly. Lower die 46 is also provided with a tapered internal marginal edge 54, and shaping die 32 with a corresponding rounded external edge 38 to assist in the shaping operation. In the form shown in Fig. 1 the auxiliary shaping die 48 also has an annular marginal depression 56.

The various members of the die assembly are arranged to be independently operated as by any convenient mechanism connected to the operating arms. This mechanism is preferably also arranged to automatically operate the various dies in a synchronized sequence. However, since the details of the operating mechanism can be of any suitable form and do not constitute any part of the present invention, they have been omitted from the present description.

Figure 2:
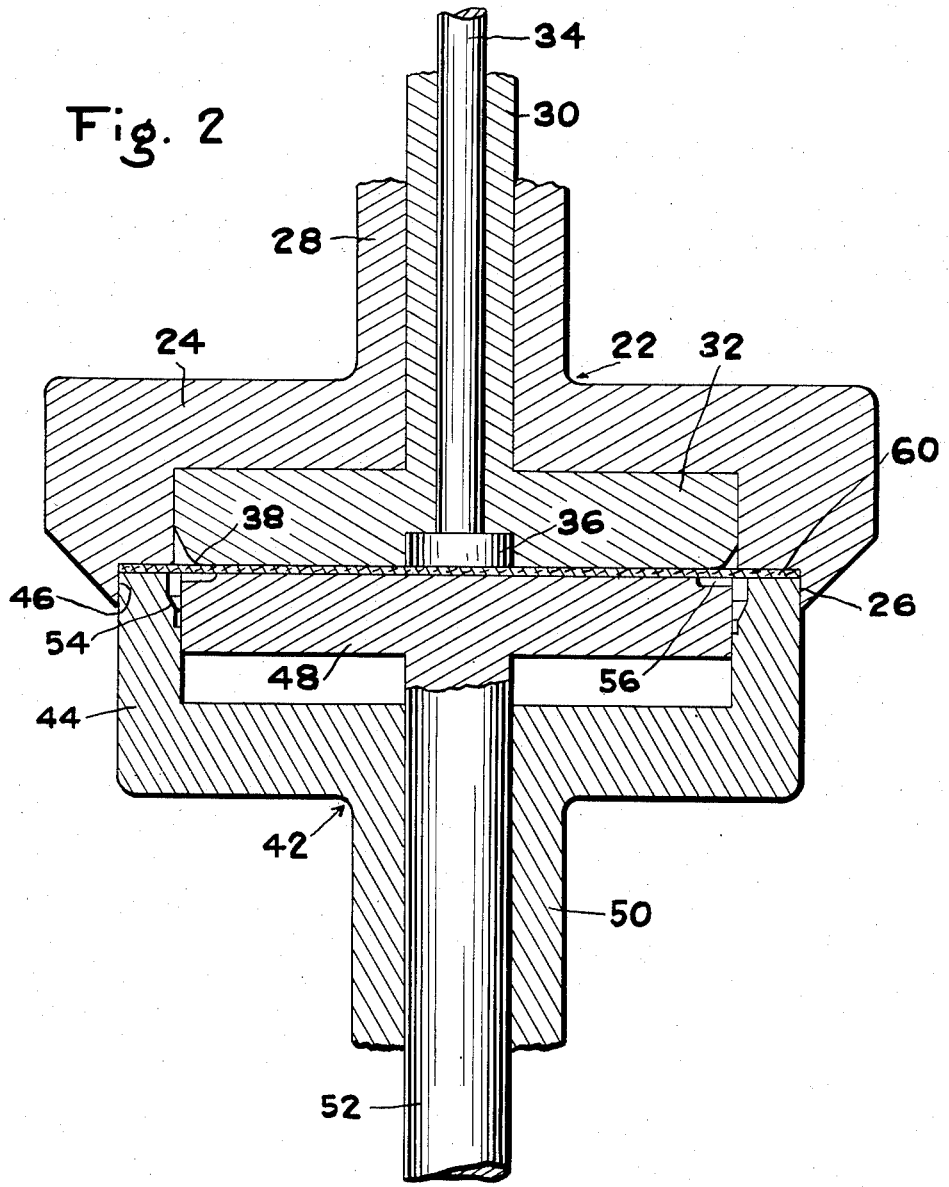
Figs. 2 and 3 are similar views showing successive steps in this method.
Figure 3:
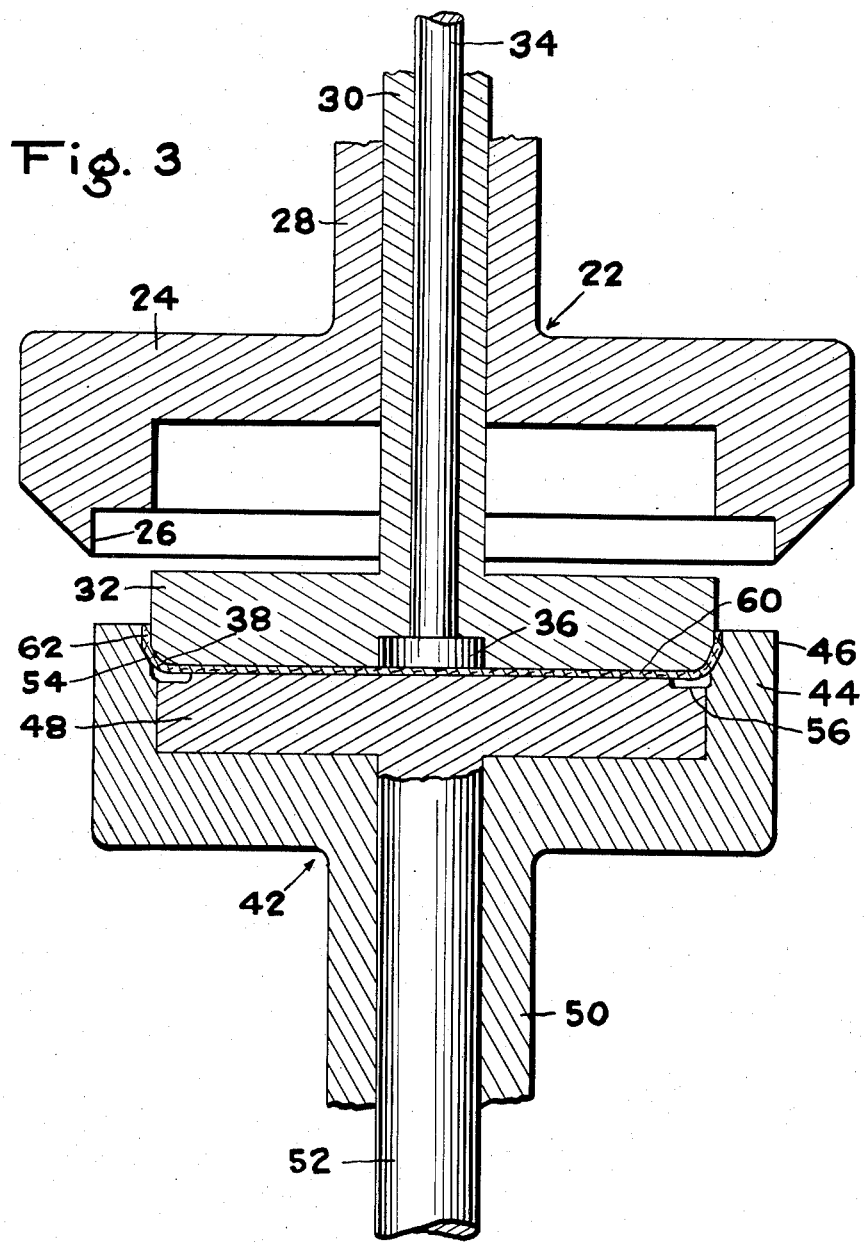

According to the present invention a cover member can be made by first inserting the cover-forming sheet 20 between the upper and lower die assemblies 22 and 42, after which the assemblies are brought together as by lowering the upper assembly to punch or blank out a disc of suitable size. The upper blanking die 24 is then lifted while the upper shaping die 32 is left in contact with the blanked disc 60, as shown in Fig. 2. Lower blanking-shaping die 44 can then be raised into the position shown in Fig. 3 to effect the bending up of a marginal wall 62. In this bending operation the angularly bent up margin becomes deformed inasmuch as its diameter is decreased. As a result, the wall 62 becomes fluted to form flutes 63, as represented in emphasized manner in Fig. 4. By limiting the clearance between the portions of the shaping dies on opposite sides of walls 62, the flutes 63 forming in this well can be creased or compacted to any predetermined degree, even to the point where they leave a substantially wrinkle-free appearance.

Fig. 4 illustrates the condition of the cover with such a substantially wrinkle-free marginal wall. The wrinkle-free wall would not be any thicker than the balance of the formed disc, inasmuch as the compacting-together of the fluted folds under pressure will compensate for the added thickness that would otherwise be produced by the folding.

The shaped cover disc is now subjected to an ironing treatment for the purpose of deforming the marginal wall 62 and thereby providing it with an inwardly directed bead. To this end the shaping dies 32, 48 are separated so as to leave the shaped disc 60 on the lower die. To assure this positioning the holding foot 36 can be held down against the lower die while the upper die 32 is retracted. After this retraction is completed the holding foot 36 can also be lifted up out of the way.

The shaped disc is now held in the lower die assembly in the manner shown in Fig. 6, and an ironing die, one form for which is shown at 82, is brought down so as to sharply compress and iron the side walls 62. This can be conveniently effected by shifting the lower die assembly 42 from a position under the upper die assembly 22 to a position under the ironing die 82. In actual use it is desirable to arrange the shifting so that it is automatically carried out as by a Geneva movement so that the shifting is effected very rapidly and prolonged dwells are provided before as well as after the shift so as to allow sufficient time for the ironing treatment.

As shown more clearly in Fig. 6, the ironing die has a wall-engaging margin 84 in the form of a kerf. The kerf has a height somewhat less than the height of the side wall 62 and also has a groove 86 in the radially outwardly facing portion of the kerf some distance above its bottom. The height of the kerf and the location of the groove are selected to provide the final cover shape that is desired.

The ironing die is now brought down against the shaped disc on the lower die assembly 42, as illustrated in Fig. 7. The mere compacting under a pressure of about 2,000 pounds per square inch will iron down the wall 62 so that it is strongly compressed, deformed, and reshaped to fit the configuration of kerf 84. This deformation includes the flowing or extrusion of some of the cover-forming material into groove 86 to form the desired bead 87. This deformation is also accompanied by a shortening of the height of wall 62 by wrinkles or creases 89 that extend around the wall in a direction perpendicular to the direction of the die-applied pressure. The appearance of the resulting article is much improved if the ironing is accentuated by rotating the ironing die with respect to the lower die assembly while pressure is maintained. This rotation gives a burnishing or calendering effect that keeps the ironed wall from losing the configuration into which it is ironed. Without the rotation the deformed wall has a tendency to spring back somewhat from the compacted configuration, thereby rendering the wall less rigid.

The relative rotation during the ironing operation can be effected with the dies compacted together at pressures of only 500 pounds per square inch since the ironing efficiency is greatly improved by the calendering action. In addition, the rotation is facilitated, and higher pressures can be used during the rotation, when the shaped disc contains at least a small amount of wax, particularly on the surface being ironed. Alternatively, or in addition to the wax, the paper disc can have a relatively high moisture content; about 10 to 25% moisture of the bone-dry weight of the disc is suitable for this purpose.

A feature of the present invention is the tapered shaping surface 54 on shaping die 44. By having this taper the shaped disc, at least after ironing, will have the top of its wall outwardly tapered to a corresponding degree. This simplifies the removal of the ironed cover from the ironing die to which it would otherwise cling very tenaciously. When the ironing is arranged to provide a wall that is entirely perpendicluar to the central portion of the body of the disc, the wall becomes so stiff and non-yielding that it is extremely difficult to pull the ironed cover off the ironing die in the positive and rapid manner required for high speed production. Only about 5 degrees of taper is sufficient to meet all production requirements.

To effect the removal of the cover from the ironing die an internally recessed detaching foot 88 can be fitted in the ironing die as shown in Figs. 6 and 7. When the ironing is completed it is then only necessary to lift up the ironing die 82 along with its detaching foot 88, thereby carrying the completed cover out from the lower die assembly 42. The lower die assembly can then be returned to a blanking location, as shown in Fig. 1. At this time the detaching foot can be extended to push the cover down and cause its locking bead to snap over the outwardly projecting portions of the kerf 84. The detached cover can then be permitted to drop as in a discharge chute conveniently positioned under the ironing die.

If desired, however, the detaching foot can be used to hold the ironed cover on the lower die assembly 42 while the ironing die 82 is lifted to thereby detach the cover and leave it on the lower die assembly. The detaching foot can then be retracted and the cover removed as by lowering the blanking-shaped die 44 and blowing the cover off the auxiliary shaping die 48 with a puff of compressed air.

In the illustrations the ironing and shaping dies are shown as provided with a configuration that leaves a marginal well 72 in the cover adjacent its peripheral wall 62. This well can be dispensed with so that the entire body portion of the cover can be perfectly flat. On the other hand, the body portion of the cover can also be made with any desired type of further convolutions, strengthening ribs, etc., and even ventilation orifices, if desired.

The cover of the present invention can also be made of laminated construction, as shown in Fig. 9, for example, by merely starting with a correspondingly laminated set of cover-forming sheets. By reason of the fluting and creasing during the shaping operation and the further creasing and ironing during the ironing operation, the laminations are securely locked together and no adhesive whatsoever is needed.

The cover can be made of varying thicknesses, depending upon the resiliency and locking action that is desired. However, a wall thickness of less than about $\frac{1}{32}$ of an inch usually shows inadequate locking except for covers of very small diameters. On the other hand, the wall can be as thick as is suitable for handling by the particular equipment to be used.

As cover-forming materials sheets of paper board made by the conventional cylinder board making machines are very satisfactory. However, paper of any other kind is also suitable although it is preferred that the paper be uncalendered when subjected to the method of the present invention. A hard calendered paper will need a relatively high ironing pressure, and is preferably moistened beforehand to approximately a 25% moisture content based on bone-dry weight.

Heating of the ironing die or its cooperating die is not necessary in accordance with the present invention, particularly if the ironing die is rotated during the ironing. The rotational friction generates some heat which helps in the ironing process. However, where the ironing die is not rotated during the ironing, then it is helpful to separately heat the ironing die 82 as well as the blanking die 44. For this purpose electric heaters can be built into those dies adjacent the ironing surfaces.

It is not necessary to practice the method of the present invention by starting with a flat sheet of cover-forming material. Thus, a cup-shaped blank can be directly made by a pulp molding operation such as is described for example in U. S. Patent No. 2,163,585 granted June 27, 1939, or U. S. Patent No. 2,251,243 granted July 29, 1941. The molded article can accordingly be directly formed from a slurry of pulp fibers into the configuration of cup-shaped disc 60, complete with up-standing walls 62, tapered or untapered as desired. The pulp molding step is particularly effective since it produces a marginal wall that is free of flutes and/or wrinkles so that the resulting article after ironing will be much stronger. Furthermore, the pulp molding operation is particularly suitable for making a tapered wall.

Although the process of the present invention is described above as carried out with the illustrated dies, it can also be carried out by other arrangements. For example, instead of using a nested set of dies in the form of die assemblies 22, 42 and 82—88, separate sets of dies can be used with only two dies per set. One such set can be arranged to effect the blanking operation, another set the shaping operation, and a third set for the ironing. Suitable provisions can be made for manual or automatic shifting of the work from one set to the next. In addition, the dies themselves can take different forms. The ironing die can, for instance, be made as a relatively small sector that extends only from the center of the work to a small portion of its periphery. Such a sector die can be rotated around the center of the work to effect the desired ironing operation. The ironed cover will not cling to such a sector die so that it can be used without a detaching foot.

The tapering of the cover wall 62 can extend the entire height of the wall instead of being confined as shown in the figures to the portion adjacent the locking bead. The taper can also be varied any amount and can be curved or horn-shaped instead of linear. In fact, any form of flaring can be used to relieve the shaping wall 54, although as pointed out above, the wall can also be made perpendicular, that it, free of taper or flare. The rounding-off 38 of the edge of shaping die 32 can also be dispensed with, particularly where flaring is used on the cooperating die.

According to a further modification, the dies can be used in inverted position, as by merely positioning the upper die assembly 22 below the work and the lower die assembly 42 above the work. The ironing die 82 can be also inverted, or if desired the inverted die assembly 42 can be arranged to rotate around so that it carries the work to the ironing die 82 held in the position shown in Fig. 6, or indeed in any other position. The rotation of the various dies can also be used to bring them into juxtaposition with the uninverted combination shown in the figures.

As shown in Fig. 8 the articles such as molded pulp dish 90 with which the cover of the present invention is used, can have a marginal flange 92 of such width that it is snugly received in the cover well 72. This helps to securely lock the cover in place with opposed walls of the well engaging the opposed sides of marginal flange 92. However, such close fitting of the cover against the opposite sides of the marginal flange is not necessary to the effective locking of the cover in place. In other words, the marginal flange 92 can be made narrower than the well 72. In fact, the matching relationship shown in Fig. 8 is completely unnecessary when the flange 92 is of more rigid construction such as metal or the like, and in such a construction narrower flanges are just as effective in holding the cover.

Inasmuch as the best results are obtained with an ironing operation that includes the frictional action of the rotating dies, the preferred covers are of circular configuration.

As many apparently widely different embodiments of this invention may be made without departing from the spirit and scope hereof, it is to be understood that the invention is not limited to the specific embodiments hereof except as defined in the appended claims.

What is claimed is:

1. A cover device comprising a relatively flat paper body having a depending peripheral skirt, said skirt comprising a first series of compressed interlocked flutes extending in one direction and a second series of compressed interlocked flutes extending in a peripheral direction and intersecting said first series of flutes and having an inwardly extending, internal peripheral bead, the rim of said skirt being defined by compressed creases extending in a substantially lateral direction relative to the peripheral direction of said skirt.

2. The device of claim 1 wherein the blank comprises a plurality of superposed laminations which are interlocked by the interlocking of the flutes.

3. A process for forming a paper cover having an internally-beaded, resilient, fluted and compacted skirt which comprises subjecting a paper blank to a circumferential pressure which simultaneously bends, creases and circumferentially compacts the peripheral portion of said blank to form a peripheral skirt having a series of compacted flutes, then subjecting said skirt to a compressive and rotative general pressure forming a series of compacted and calendered flutes extending in a direction substantially perpendicular to and intersecting said first flutes, while simultaneously subjecting an intermediate portion of said skirt to an additional local pressure effecting a flowing of some of the material in said intermediate portion to form a lateral bead.

References Cited in the file of this patent

UNITED STATES PATENTS

| | | |
|---|---|---|
| 879,865 | Godfrey | Feb. 25, 1908 |
| 1,153,518 | Ray | Sept. 14, 1915 |
| 1,180,469 | Blakeslee | Apr. 25, 1916 |
| 1,799,357 | Davis | Apr. 7, 1931 |
| 1,842,542 | Dailey | Jan. 26, 1932 |
| 1,870,062 | Moore | Aug. 2, 1932 |
| 2,136,308 | Miller | Nov. 8, 1938 |
| 2,144,273 | Raymond | Jan. 17, 1939 |
| 2,325,161 | Goodwin et al. | July 27, 1943 |
| 2,355,559 | Renner | Aug. 8, 1944 |
| 2,595,046 | Amberg | Apr. 29, 1952 |
| 2,614,727 | Robinson | Oct. 21, 1952 |